April 30, 1968 J. R. SCHIEBER ETAL 3,380,462
METHOD AND APPARATUS FOR THE USE OF ACROLEIN
Filed Dec. 29, 1966
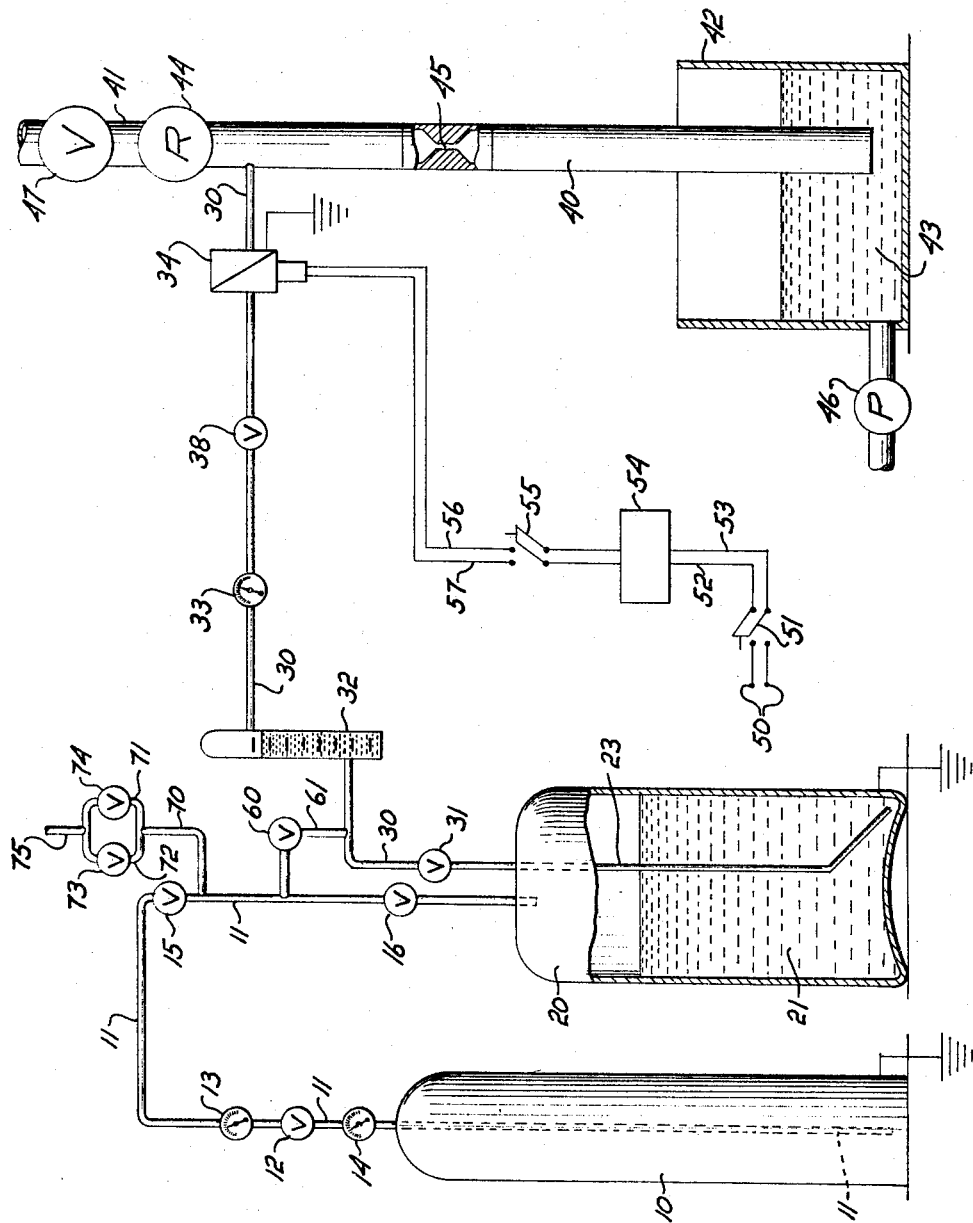
INVENTORS
John R. Schieber
Otto H. Reis
William J. Holcomb
ATTORNEY

United States Patent Office 3,380,462
Patented Apr. 30, 1968

3,380,462
METHOD AND APPARATUS FOR THE USE OF ACROLEIN
John R. Schieber, Holland, and Otto H. Preis, Jenkintown, Pa., assignors to Betz Laboratories, Inc., Philadelphia, Pa., a corporation of Pennsylvania
Continuation-in-part of application Ser. No. 372,889, June 5, 1964. This application Dec. 29, 1966, Ser. No. 619,880
5 Claims. (Cl. 137—3)

The present invention relates to methods and apparatus for the injection of acrolein into aqueous liquids or dispersions and more particularly to safe, self-operating and self-contained systems for the injection of acrolein into aqueous paper and pulp mill systems and cooling process water. The present application is a continuation-in-part of co-pending U.S. patent application Ser. No. 372,889 which was filed on June 5, 1964 now abandoned.

Acrolein is highly effective as a biocidal agent in the treatment of liquids containing slime-forming microorganisms. This utility is amply disclosed by U.S. Patents 2,959,476 to Van Overbeck, and 3,250,667 to Legator. However, the use of this composition has been severely impeded by its hazardous properties. In the first instance, acrolein vapors are highly volatile, poisonous when inhaled, and extremely irritating to the eyes, skin and respiratory tract. In addition, these vapors form a highly combustible admixture in air over a broad percentage range, and consequently represent a pronounced fire and explosion hazard. The physiological potency of acrolein is demonstrated by the fact that exposure to a vapor concentration of 0.25 part per million for a period of 5 minutes causes moderate irritation, a concentration of 1 p.p.m. causes painful irritation in the same period of time, and a concentration of 150 p.p.m. for 10 minutes is believed to be fatal to humans. The fire-explosion hazard which it presents is demonstrated by a flash point of less than 0° F. and the "National Fire Protection Association Quarterly" of July 1954 reports a severe disaster which was initiated by acrolein.

These conditions, when combined with the availability of acrolein only in tank cars and conventional steel drums, have seriously retarded the commercial utilization of acrolein as a biocidal agent. In such applications, the limited quantities involved have mitigated against expensive safety systems and the training of qualified personnel in the safe handling of this material. Any other proposed method of use has been plagued by the real and hazardous possibility of the rupture or leaking of the storage and feeding equipment employed, with consequent toxicity and/or fire-explosion damage to personnel and equipment. Even if the fatal consequences of inhalation, fire or explosion could be checked in time, the irritation and lachrymation caused by even minute quantites of escaped vapors are a pronounced disadvantage. Similarly, expensive protective equipment such as gas masks would be required during the start up of the treatment, and explosion-proof equipment would be necessitated in all areas adjacent to the apparatus for the storage and feed of acrolein. Furthermore, air accelerates the polymerization of this product with a consequent increase in the explosion risk, and elaborate equipment would be required for the purpose of avoiding the formation of an air-vapor admixture within the storage and feeding systems.

It is an object of the invention to provide safe, simple and economical methods and apparatus for the addition of acrolein to aqueous liquids or dispersions.

A further object is the provision of methods and apparatus whereby acrolein may be added to aqueous liquids or dispersions without danger of the escape of acrolein to the surrounding atmosphere and the consequent hazards of toxicity, fire and explosion.

Another object is the provision of methods and apparatus whereby acrolein may be added to aqueous liquids or dispersions without danger of the entrainment of air within the acrolein storage and feeding facilities, and the fire and explosion hazards which would otherwise result.

An additional object is the provision of methods and apparatus whereby acrolein may be added to aqueous liquids or dispersions without the danger of contamination by the liquid being treated.

Still another object is the provision of methods and apparatus whereby condition changes in the aqueous liquids or dispersions which are being treated, with a corresponding change in the demand for acrolein, results in the curtailment or elimination of the addition of acrolein.

Yet another object is the provision of acrolein feed apparatus and methods which permit the emplacement of new acrolein sources without hazard during the installation phase.

These and other objects will become apparent upon examination of the specification and claims in conjunction with the drawings which consist of a diagrammatic view of a system and method of the invention.

In the practice of the present invention, acrolein is transported, stored and utilized in a high pressure vessel which is leak-proof and highly resistant to rupture. In addition, during shipping, storage and use, the acrolein is masked by an inert gas which excludes air and thereby avoids the fire-explosion hazards which are implicit in air-acrolein vapor admixtures. In this regard it should be noted that acrolein is highly soluble in water and that once dissolved it will not revert to release hazardous vapors. Consequently, although hazards attend acrolein during its manufacture, shipping, storage and use, such hazards are completely eliminated once it is dissolved in water. Such circumstances suggest the use of acrolein as an aqueous solution. However, the biocidal activity of this compound begins to diminish as soon as the solution is formed and soon becomes non-existent. Furthermore, in the inventive practices the contamination of the acrolein by air entrained in the liquids to be treated is completely avoided. Still further, the escape of acrolein during the curtailed flow of the liquid to be treated is avoided. Finally, acrolein escape during shutdowns or the replacement of acrolein supply sources is obviated.

These goals are achieved by employing the acrolein in a high pressure vessel, dispelling it from the vessel by means of a gas which is inert to acrolein, providing a controlled pressure zone within the liquid to be treated, adding the acrolein to the controlled pressure zone, and curtailing the addition of the acrolein in response to any curtailment of the flow of the liquid through the controlled pressure zone.

These methods and apparatus may best be understood in relation to the drawing which depicts a preferred embodiment. This embodiment includes a cylinder 10 of the type normally employed for the storage of compressed gases. The cylinder 10 contains a compressed gas, and preferably nitrogen, which is inert in respect to acrolein. The cylinder 10 is provided with piping 11 which contains a pressure regulator valve 12 and a line pressure gage 13. Preferably, the piping is also provided with a cylinder pressure gage 14 which is positioned between the valve 12 and the cylinder 10 while the line pressure gage is located downstream from the valve 12. In such an arrangement the cylinder pressure gage 14 indicates the pressure of the gas contained by the cylinder 10, while the line pressure gage 13 indicates the gas pressure in the piping 11. When the pressure regulator valve 12 is opened to the desired extent, the gas flows through the piping 11 under pressure, and to pressure vessel 20 which contains acrolein 21. The piping 11 linking the cylinder 10 and the vessel 20, is preferably provided with a check valve 15 which prevents the return of the gas and any entrained material such as the acrolein 21 to the cylinder 10, and a shutoff valve 16. The gas enters the vessel 20 through inlet 22 to provide a propellant cushion of the gas above the acrolein 21 and force the acrolein 22 through outlet line 23 which is located with its open end beneath the surface of the acrolein 21. The acrolein 21 is thus propelled into feedline 30 which is provided with a vessel outlet valve 31, a rotameter 32 which registers flow through the feedline 30, a flow regulator 38, and a feedline pressure gage 33 which measures pressure within the feedline 30. The feedline 30 is further provided with a solenoid valve 34 which is normally closed. The feedline 30 is connected to a controlled pressure zone 40 of fluid line 41. The fluid line 41 is preferably, and as depicted, a feed conduit to the process 42 to be treated. However, the fluid line 41 may also comprise a by-pass circuit which removes the fluid 43 from the process 42 for admixture with the acrolein 21, and thereafter returns the admixture of fluid and acrolein to the process 42. The controlled pressure zone 40 is created by means of a pressure regulator 44 and a reducing orifice 45. The flow regulation provided by the flow regulator 38 in feedline 30 is essential to the practice of the invention. Since the upstream pressure, e.g. in piping 10, is in excess of the pressure in the controlled pressure zone 40, the entire contents of the pressure vessel 20 would be immediately injected into the controlled pressure zone 40 in the absence of the regulation provided by the flow regulator 38. While the flow regulator 38 may be either adjustable or fixed, an adjustable regulator is preferred. In such case, the flow regulator 38 may be employed to control the quantity of acrolein which is injected into the conrolled pressure zone 40 by opening or closing the flow regulator 38. When the pressure regulator 38 is of the fixed type, the quantity of acrolein being injected may be controlled by adjusting the pressure within the controlled pressure zone 40, e.g. by adjusting pressure regulator 44 and/or the reducing orifice 45. Alternatively, the quantity of acrolein may be controlled by means of the regulator valve 12 but this method is less efficient due to the pressure reservoir which is provided by that portion of the interior of the pressure vessel 20 which is not occupied by acrolein 21.

A suitable source of current 50 is fed through shutoff switch 51 to conductors 52 and 53, and through switch means 54 to switch 55 and leads 56 and 57 which connect to the solenoid valve 34. Switch means 54 are of the type which respond to a change in flow through fluid line 41, or alternatively to a change in the operation of a flow pump such as process pump 46. Since flow through the fluid line 41 is normally correlated to withdrawal of the fluid 43 from the process 42, cessation of such withdrawal may serve as the stimulus which terminates the feed of the acrolein 21 through the feedline 30. However, the actuation of the seloneid valve 34 with consequent curtailment of the feed of acrolein may be more directly related to actual flow in the fluid line 41. For example, in a process in which the flow through fluid line 41 and the action of process pump 46 are not necessarily related, the switch means 54 may respond to flow in the controlled pressure zone 40 or at points upstream or downstream of the controlled pressure zone 40. For example, switch means 54 may be linked to spaced electrodes positioned within the controlled pressure zone 40 which are bridged by fluid 43 present within the controlled pressure zone 40 to complete an electrical circuit. Alternatively, electrodes within the controlled pressure zone 40 may be displaced from contact with one another to open the circuit during fluid flow and close it upon cessation of flow. In the latter instance the solenoid valve employed would be one which is closed when electrically energized and open when the circuit is broken, i.e. a normally open solenoid valve. Similar arrangements may be employed either upstream or downstream of the controlled pressure zone 40.

In yet another embodiment, the switch means 54 may be connected to a flow switch or pump 47 which controls flow into the controlled pressure zone 40. In such case, the solenoid valve 34 may be closed when the flow switch 47 is closed or when the operation of the pump 47 is terminated.

In those processes in which flow through the fluid line 41 is terminated when the level of the liquid 43 reaches a predetermined height within the process 42, the switch means 54 may be actuated by a float switch positioned in the process 42 which is buoyantly displaced by the rising level of the liquid 43.

For convenience and added safety, flushing and venting systems may also be employed. For example, a flush valve 60 may be installed on a flush line 61 which connects piping 11 and feedline 30. Similarly, feedline 30 may be connected to manifold 71 and 72 by a manifold line 70. Manifold 71 and 72 are in turn connected to relief valve 73 which is set at a desired pressure, e.g. 125 pounds per square inch, and manual vent valve 74. The realization of pressures in excess of that setting then results in venting through relief valve 74 and vent line 75, whereas valve 74 permits the manual venting of the system.

In the practice of the inventive methods and apparatus, all valves are first closed, flow control valve 47 is opened to initiate flow through the controlled pressure zone 40, solenoid valve 34 is then energized by closing switches 51 and 55, and valves 16 and 31 are then opened. Pressure regulator valve 12 is then opened and the pressure into vessel 20 is gradually increased until the pressure of gas flow into the vessel 20 is in excess of the pressure in the controlled pressure zone 40, i.e. preferably at least 20 pounds per square inch in excess of the pressure in controlled pressure zone 40. The flow regulator 38 is then opened and rate of flow of acrolein 21, as indicated by rotameter 32, is adjusted by the flow regulator 38.

As may be observed, the gaseous medium removes the acrolein from its storage container and injects it into the liquid to be treated at a pressure in excess of the pressure of the liquid. Simultaneously, the injection of the acrolein is terminated or curtailed by changes in the flow of the liquid being treated. Furthermore, the acrolein storage and feed system is protected against the encroachment of materials which might yield hazards if combined with the acrolein. In addition, the acrolein is stored and shipped in a container which resists leaking and rupture. Still further, new acrolein supply receptacles may be emplaced in the system without hazard.

It is apparent that the applicants have provided methods and apparatus for the safe, efficient and economical utilization of acrolein to aqueous systems. It is further obvious that various changes, alterations and substitutions may be made in the inventive methods and apparatus, without departing from the spirit of the invention as defined by the following claims.

We claim:

1. A method for adding acrolein to aqueous process fluids, comprising flowing said fluids first through a pressure regulator and then through a reducing orifice to provide a controlled pressure zone between said pressure regulator and said reducing orifice, injecting a gas substantially devoid of oxygen and inert to acrolein at a pressure in excess of the pressure of said controlled pressure zone into a vessel containing acrolein and from which oxygen is excluded, to displace said acrolein from said vessel to said controlled pressure zone and admix said acrolein with said fluids, passing said acrolein through regulator means prior to its entry into said controlled pressure zone to control the flow of said acrolein, and terminating the displacement of said acrolein in response to the termination of the flow of said fluids.

2. A method as claimed by claim 1 in which said gas is nitrogen.

3. A system for adding acrolein to acqueous process fluids, comprising a controlled pressure zone positioned between a flow regulator and a reducing orifice through which said fluids are flowed, a cylinder containing a gas inert to oxygen and substantially devoid of oxygen at a pressure in excess of the pressure of said controlled pressure zone, a vessel containing acrolein and substantially devoid of oxygen, first conduit means connecting said cylinder and said vessel, second conduit means connecting said vessel and said controlled pressure zone and extending into said acrolein in said vessel, said second conduit means including valve means responsive to the flow of said fluids to terminate the flow of said acrolein to said zone in response to the termination of the flow of said fluids and regulator means controlling the flow of said acrolein to said zone.

4. A system as claimed by claim 3 in which said valve means are an electrically actuated solenoid valve.

5. In a system for injecting acrolein into a process flow line, a pressure cylinder containing acrolein, a source of gas at a pressure above the process flow pressure, said gas being inert to acrolein, first conduit means connecting the gas source to the pressure cylinder, second conduit means connecting the pressure cylinder to the process flow line and extending into the acrolein in the pressure cylinder, said second conduit means including an electrically energized solenoid operated valve, and said process flow line having regulator means in combination with orifice means for maintaining a constant pressure below the pressure of the gas source at the point at which the second conduit means is connected to said process flow line and switch means controlling electrical energy to the solenoid valve and responsive to the operation of the process, whereby interruption of the process opens the switch means and de-energizes and closes the solenoid operated valve.

References Cited

UNITED STATES PATENTS

| | | | |
|---|---|---|---|
| 2,203,980 | 6/1940 | Burt | 137—7 |
| 2,218,393 | 10/1940 | Corydon | 137—209 X |
| 2,707,964 | 5/1955 | Monroe | 137—7 X |
| 2,843,138 | 7/1958 | Gilman | 137—3 X |
| 2,989,969 | 6/1961 | Gascoin | 220—88 X |
| 3,100,496 | 8/1963 | Reiser | 137—111 |

ALAN COHAN, *Primary Examiner.*